United States Patent [19]

Cohen

[11] 4,012,344

[45] Mar. 15, 1977

[54] TIRE TREAD COMPOSITIONS HAVING IMPROVED LOW TEMPERATURE PROPERTIES

[75] Inventor: Harvey L. Cohen, Matawan, N.J.

[73] Assignee: Exxon Research & Engineering Co., Linden, N.J.

[22] Filed: Oct. 6, 1975

[21] Appl. No.: 619,635

Related U.S. Application Data

[63] Continuation-in-part of Ser. No. 475,988, June 3, 1974, Pat. No. 3,919,130.

[52] U.S. Cl. .......................... 260/4 R; 156/128 T; 260/5; 260/888; 260/889; 260/890; 260/892; 260/994; 260/896; 526/339
[51] Int. Cl.² ..................... C08L 7/00; C08L 23/20
[58] Field of Search ................. 260/4, 5, 888, 889, 260/892, 894, 896; 526/339

[56] References Cited

UNITED STATES PATENTS

| 3,250,733 | 5/1966 | Giller et al. | 260/888 |
| 3,483,176 | 12/1969 | Miyoshi et al. | 526/339 |

Primary Examiner—J. Ziegler
Attorney, Agent, or Firm—John J. Mahon

[57] ABSTRACT

Tires having both improved wet skid resistance and low temperature performance properties are prepared by blending into conventional tire tread compositions a copolymer of isobutylene and cyclopentadiene (CPD) having a CPD content of between 5 and less than 20 mol %. The tire tread composition preferably contains about 30 wt. % of cyclopentadiene copolymer. Low temperature properties are improved compared to compositions containing greater than 20 mol % CPD in the copolymer.

6 Claims, No Drawings

TIRE TREAD COMPOSITIONS HAVING IMPROVED LOW TEMPERATURE PROPERTIES

CROSS-REFERENCE

This application is a continuation-in-part of copending application Ser. No. 475,988, filed June 3, 1974 now U.S. Pat. No. 3,919,130.

BACKGROUND OF THE INVENTION

Automobile tires are finally prepared as composites of various materials, a primary component being rubber. Generally, various parts of the tires are prepared from different formulations in order to demonstrate optimum properties and their respective functions.

The tire tread of an automobile tire in addition to being the wear surface must also exhibit good skid resistance and, in particular, good wet skid resistance. It is also highly desirable to provide tire tread compositions capable of functioning well at low temperatures and having an improved resistance to stiffness or brittleness tendencies at such low temperatures, such as about 0° F.

Rubbers which have been used in the manufacture of tire tread compositions include natural rubber and synthetic rubbers such as polyisoprene, styrene butadiene rubber (SBR), polybutadiene rubber (BR) as well as ethylene-propylene copolymers (EPM), ethylene-propylene-diene terpolymers (EPDM), butyl rubber copolymers as defined in U.S. Pat. No. 2,356,128, which contain 85–99.5% of combined $C_4$–$C_7$ isoolefin and 0.5 to 15% of combined $C_4$–$C_{14}$ multiolefin and chlorinated butyl rubbers containing 0.5 to 3.0 wt. % combined chlorine, as defined in U.S. Pat. No. 3,099,644. Symbols for rubber polymers used herein such as BR are defined in ASTM-D-1418-72a. Tires prepared from butyl rubber have been found to have better skid resistance than others, but wear properties are not completely adequate. Blends of chlorinated butyl rubber with SBR and BR do exhibit improved wet skid resistance but the wear properties are inferior to those of conventional tire tread compositions.

SUMMARY OF THE INVENTION

It has been found that by incorporating about 20 to 40 wt. % of a copolymer of isobutylene and cyclopentadiene, the copolymer containing at least 5 and less than 20 mol % of cyclopentadiene, into a conventional tire tread composition of general purpose rubber as defined hereafter, such as, for example, SBR and polybutadiene, improved wet skid resistance is obtained as well as improved low temperature dynamic properties particularly when such blends are compared to those containing greater than 20 mol % of cyclopentadiene in the copolymer. Thus, in the present invention, the cyclopentadiene copolymer should contain less than 20 mol % of cyclopentadiene. Preferably, the amount is from 10 to 19 mol % of cyclopentadiene (CPD) with the optimum range being 12 to 18 mol % of CPD, such as 15 mol %.

In the aforesaid patent application, Ser. No. 475,988, the improvements obtainable in employing the relatively lower aforesaid mol % range of CPD were not recognized.

The compositions prepared from such blends demonstrate wet skid resistance superior to those of conventional blends while at the same time other properties such as wear and heat build-up are not adversely affected to an objectionable degree, and importantly, excellent low temperature performance properties are obtained, particularly a marked resistance to stiffening.

DETAILED DESCRIPTION

This invention relates to an improved tire tread composition. In particular, it relates to a tire tread composition having the desirable combined properties of improved wet skid resistance and low temperature performance, that is, resistance to stiffening and brittleness.

The compositions of this invention are tire tread compositions wherein the elastomeric rubber component comprises various general purpose rubbers in combination with a copolymer of isobutylene and cyclopentadiene. The composition should comprise at least 20% of said copolymer, preferably 20 to 40 wt. % of said copolymer, more preferably 25 to 35 wt. %, such as, for example, 30 wt. % of the CPD copolymer, the balance of the rubber polymers being general purpose rubbers.

The term "CPD copolymers" as used in the specification means an elastomeric copolymer of isobutylene and cyclopentadiene. The preparation of such copolymers having elastomeric properties is well known in the art and is described, for example, in U.S. Pat. No. 3,808,177, issued Apr. 30, 1974 to Thaler et al. Generally, the CPD copolymers useful in the present invention will have a Mooney Viscosity (ML 1+8 at 260° F.) of about 20 to 125, preferably about 40 to 115 and will contain at least 5 mole % unsaturation.

The term "general purpose rubber" as used in the specification and claims means the high unsaturation rubbers of commerce including natural rubber, polyisoprene, styrene butadiene rubber (SBR), and polybutadiene rubber (BR). In the usual preparation of compositions for use in automotive tire tread manufacture, it is customary to use a blend of one or more of the above general purpose rubbers in order to make use of the most advantageous properties of each. A conventional tire tread formulation comprises about 70 weight percent SBR and about 30 weight percent BR. The compositions of the present invention will contain 80% to 60%, preferably about 70% by weight of a general purpose rubber or various blends of one or more of said general purpose rubbers. A preferred general purpose rubber is a blend composed of 40 to 60, preferably 50, parts by weight of SBR rubber and 10 to 30, preferably 20 parts by weight of BR rubber.

The tests used in evaluating the composition of this invention are described as follows:

1. Wet skid resistance - Wet skid resistance was measured using standard tests designated ASTM E303-69. This test comprises scuffing a test sample across a wet test plate which simulates the road surface. The test plate used in these studies was Syenite glass since this composition has characteristics similar to the road surface.

In carrying out the test, a test sample is secured to a pendulum which is released and caused to scuff across the test plate. As the pendulum swings past the test plate, it moves a pointer. The motion of the pointer is limited by the arc through which the test sample pendulum moves. The reading obtained is an absolute number.

2. Damping and Spring Rate - Measured using an MTS-830 Elastomer Test System. Hydraulically driven, forced-vibration tester, rectangular cross-section blocks, 190 lb. compressive preload, frequency and displacement varied. This testing procedure and apparatus is described in "The Measurement of the Dynamic Properties of Elastomers and Elastomeric Mounts" a synposium Volume published in 1973 by the Society of Automotive Engineers (SAE) in articles by R. C. Leonard (Article No. 730257), R. C. Puydak (Article No. 730268) and J. H. Owens (Article No. 730260).

In the composition set forth in the table below, various tread formulations were prepared and evaluated for wet skid resistance and low temperature properties. The materials (trademark in quotation marks) used are identified as follows:

SBR 1502 —23.5% bound styrene, Mooney Viscosity (ML 1+4 at 212° F.) = 52

Polybutadiene Grade 1203 - cis content 93%, Mooney Viscosity, (ML 1+4 at 212° F.) = 45

N-339 Carbon Black - ASTMD-1765

"Sundex 790" Oil - Aromatic extender oil, ASTMD-2226 Type 102

"Thermoflex A" - antiflex cracking antioxidant: 50% N-phenylbeta-naphthylamine, 25% 4,4'-dimethoxydiphenylamine phenyl-p-phenylenediamine "Santocure NS" - N-t-butyl-2-benzothiazolesulfenamide.

"DPG" - Diphenyl guanidine

Vulcanization conditions were 25 min. at 300° F. In all cases a standard compression molding press, 20 in. × 20 in., operating at approximately 2000 psi was used for vulcanization of the samples. Various compositions were prepared and tested for evaluation as tire tread compositions. The formulation was compounded using laboratory internal mixers ("midget" Banbury, approximately 300 cc chamber) and mills (6 in. × 12 in., two rolls). The mix cycle utilized was as follows: polymers added; at 0.5 min., stearic acid and antiflex antioxidants; at 1.0 min., approximately 90% carbon black; at 3.0 min., remainder of carbon black and all extender oil; at approximately 6.0 min., dump (batch temperature 290°–310° F.). Curative and accelerators were incorporated into the compound on the roll mill. Test samples were then prepared from the formulations and tested as set forth in the table.

TABLE I

| TREAD FORMULATIONS Parts by Weight | | | | | |
|---|---|---|---|---|---|
| | Run No. 1 | Run No. 2 | Run No. 3 | Run No. 4 | Run No. 5 |
| SBR 1502 | 70 | 50 | 50 | 50 | 50 |
| Polybutadiene (grade 1203) | 30 | 20 | 20 | 20 | 20 |
| Cyclopentadiene copolymer- 15 mole % of CPD[2] | — | 30 | — | — | — |
| Cyclopentadiene copolymer- 20 mole % of CPD[3] | — | — | 30 | — | — |
| Cyclopentadiene copolymer- 26 mole % of CPD[4] | — | — | — | 30 | — |
| Cyclopentadiene copolymer- 32 mole % of CPD[5] | — | — | — | — | 30 |
| Wet Skid Resistance[6] | 16.5 | 21.8 | 21.0 | 21.3 | 21.1 |
| Spring rate, k, at 0° F.[7] | 34,850 | 74,850 | 88,200 | >100,000 | >100,000 |
| Damping at 0° F.[7] | .216 | .322 | .280 | — | — |

[1] All compounds contain: N-339 carbon black - 65; Sundex 790 oil - 30; Thermoflex A - 0.75; Stearic acid - 1; Zinc Oxide - 3; Sulfur - 1.6; Santocure NS - 1.2; DPG - 0.1.
[2] Mooney viscosity (ML 1+8 at 260° F.) = 90
[3] Mooney viscosity (ML 1+8 at 260° F.) = 112
[4] Mooney viscosity (ML 1+8 at 260° F.) = 101
[5] Mooney viscosity (ML 1+8 at 260° F.) = 105
[6] British portable skid resistance tester, Syenite glass surface (ASTM E303–69)
[7] 190 lb. preload, 2.0 mils/100 cps. Value for damping calculated as cw/k where c = damping coefficient, w = frequency, k = spring rate

What is claimed is:

1. A tire tread composition exhibiting improved wet skid resistance and low temperature properties, the rubber polymer component comprising a blend of at least one general purpose rubber selected from the group consisting of natural rubber, polyisoprene, styrene butadiene, and polybutadiene and at least 20 wt. % of an elastomeric copolymer of isobutylene and cyclopentadiene, based on the weight of the copolymer plus said general purpose rubber, wherein said copolymer contains from at least 5% to less than 20 mol % of cyclopentadiene.

2. The composition of claim 1 wherein the general purpose rubber comprises a blend of styrene-butadiene rubber and polybutadiene rubber.

3. The composition of claim 2 wherein the composition comprises a blend of about 50 parts of SBR and 20 parts by weight of polybutadiene rubber as the general purpose rubber.

4. The composition of claim 1 wherein the copolymer is incorporated into the blend at about 20 to about 40 wt. %.

5. The composition of claim 1 wherein the cyclopentadiene content of the copolymer is from 10 to 19 mol %.

6. The composition of claim 1 wherein the copolymer comprises about 30 wt. % of said blend and the cyclopentadiene content of the copolymer is from 12 to 18 mol %.

* * * * *